UNITED STATES PATENT OFFICE.

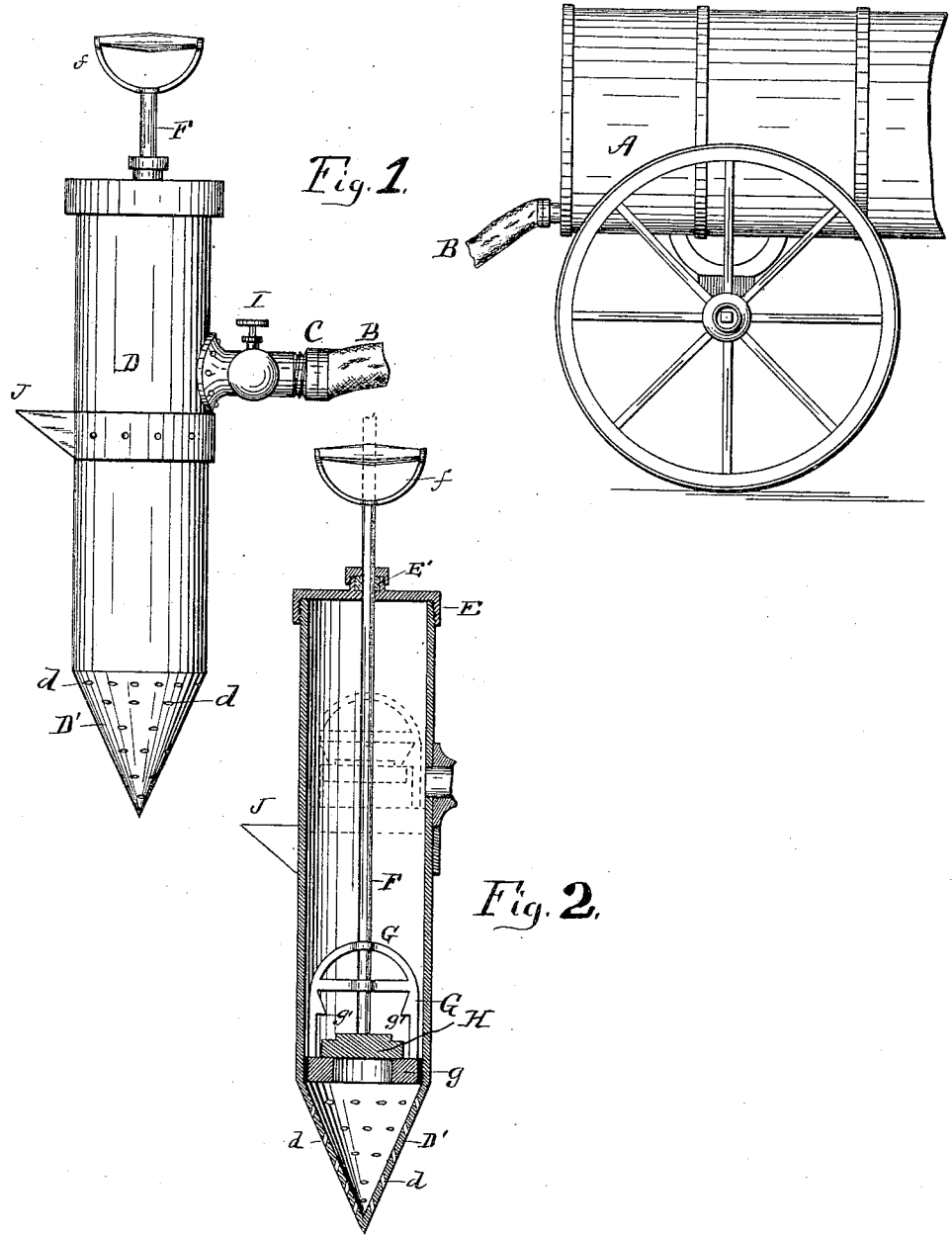

JOSIAH H. L. TUCK, OF SAN FRANCISCO, CALIFORNIA.

SUBSOIL IRRIGATOR AND FERTILIZER.

SPECIFICATION forming part of Letters Patent No. 434,814, dated August 19, 1890.

Application filed December 30, 1889. Serial No. 335,325. (No model.)

*To all whom it may concern:*

Be it known that I, JOSIAH H. L. TUCK, a citizen of the United States, residing at San Francisco, in the county of San Francisco and State of California, have invented certain new and useful Improvements in Subsoil Irrigators and Fertilizers; and I do hereby declare the following to be a full, clear, and exact description of the invention, such as will enable others skilled in the art to which it appertains to make and use the same.

My invention relates to devices for irrigating and fertilizing the soil, and has for its object the provision of a cheap and efficient subsoil irrigator and fertilizer, by means of which water and liquid fertilizers may be applied beneath the soil immediately at the root of a plant of any sort, whereby the full strength and efficacy of the irrigant or fertilizer are utilized without loss from evaporation or by injudicious distribution through the soil. It also overcomes the objection to surface irrigation which arises from baking or packing of the surface of the ground resulting from the application of the fluid to the top of the soil. It likewise economizes time in the application of irrigants and fertilizers, as well as effecting a saving in the quantity of liquid used to produce a given result, which in the case of fertilizers is a matter of considerable momentary value.

The device consists, essentially, of a tube having its lower end shaped to readily enter the soil by pressure and suitably perforated to emit the liquid, provided with a suitable piston or plunger and means for operating it, said tube being connected to a hose or piping, which leads to a head or source of supply, which is preferably a tank mounted on a running-gear or truck, by which it may be moved from place to place. One of several of such irrigators may be connected to the same tank.

Various structural features of novelty, in addition to the general construction above referred to, will be pointed out in the following detailed description and claim.

The accompanying drawings illustrate what I consider the best means for carrying my invention into practice.

Figure 1 is an elevation of the irrigator, showing a tank from which water is taken. Fig. 2 is a longitudinal section of the irrigator.

Similar letters of reference indicate corresponding parts in both figures where they occur.

A is the tank or barrel affording the supply for the irrigator. This is preferably mounted upon a truck, as indicated, and can be moved from point to point through a patch or ranch to accommodate the use of the irrigator.

B is a hose or tubing extending from the tank to the irrigator. There may be one or more such connections, according to the number of irrigators intended to be operated.

C is a coupling connecting the hose to the irrigator.

D is a tube or cylinder forming the body of the subsoil-irrigator. It may be of any suitable diameter and length, according to the capacity desired. At its lower end it terminates in a pointed penetrator D' to enter the soil, which is perforated to emit the irrigant or liquid fertilizer. The perforations $d\ d$ in this pointed end are inclined downward, as shown, to discharge the liquid in downwardly-inclined lines, as indicated in Fig. 2. The top of the tube is finished with a cap E and stuffing-box E', which is removable with the cap. The cap is preferably screwed upon the tube, as shown in the sectional view, Fig. 2. A piston-rod F, with a handle $f$ above the cap E, passes through the cap and stuffing-box. At its lower end it works loosely in a stirrup G, and has a valve H fixed upon its lower end, which is seated in the downward movement of the rod upon the step $g$ of the stirrup and bears against the stops $g'\ g'$ in the upward movement, so that the stirrup is carried with the valve in both movements; but sufficient play is allowed the valve to open the way through the stirrup-step when the rod is drawn up, and thus permit the water to flow through the stirrup and into the tube below the valve. This enables me to gage the amount of deposit at each plant by limiting the elevation of the piston and move from plant to plant without waste of material. If desired, however, the stirrup may be dispensed with and the valve on the end of the piston-rod fill the entire transverse area of the tube, in which case the valve or plunger will have to be raised above the water-connection each time in order to get water into the lower end of the tube.

A cock I may be placed in the connection to the tank, so as to shut off the flow, and thus enable me to inspect or mend the irrigator without loss of or interference by water, and to securely cut off the flow when the operation is discontinued.

A rest J is secured upon the side of the irrigator for the operator to place his foot upon to press the device into the soil preparatory to depositing the irrigant or fertilizer.

When the liquid-connection is opened and the device pressed into the ground to a sufficient distance, the piston-rod is first raised to the proper height to get the required charge of liquid beneath the valve, when upon pressing the valve-rod down the charge will be squirted out through the apertures $d\ d$ into the soil, after which the implement is withdrawn from the soil and the opening left by it is closed by the foot, if desired.

It will be seen that the action is speedy and effective, resulting in great saving of time and economy in the use of the irrigant.

Having thus described my invention, what I claim, and desire to secure by Letters Patent, is—

The combination, with a cylinder having a pointed and perforated lower end and a removable cap and stuffing-box at the upper end, of a plunger having a rod working through said cylinder and stuffing-box, said plunger consisting of a stirrup loose upon the plunger-rod and a valve fixed upon said rod and vertically movable in the stirrup, as set forth.

In testimony whereof I affix my signature in presence of two witnesses.

JOSIAH H. L. TUCK.

Witnesses:
 WALTER R. CRAIG,
 LEWIS B. HARRIS.